United States Patent
Greene (10) Patent No.: US 9,675,956 B2
(45) Date of Patent: Jun. 13, 2017

(54) CONVERSION OF TRIACYLGLYCERIDES-CONTAINING OILS

(71) Applicant: Lummus Technology Inc., Bloomfield, NJ (US)

(72) Inventor: Marvin I. Greene, Clifton, NJ (US)

(73) Assignee: Lummus Technology Inc., Bloomfield, NJ (US)

( * ) Notice: Subject to any disclaimer, the term of this patent is extended or adjusted under 35 U.S.C. 154(b) by 157 days.

(21) Appl. No.: 14/685,781

(22) Filed: Apr. 14, 2015

(65) Prior Publication Data

US 2015/0217265 A1 Aug. 6, 2015

Related U.S. Application Data

(62) Division of application No. 13/711,140, filed on Dec. 11, 2012, now Pat. No. 9,024,096.

(51) Int. Cl.
*B01J 19/24* (2006.01)
*C10G 3/00* (2006.01)
(Continued)

(52) U.S. Cl.
CPC ............. *B01J 19/24* (2013.01); *B01J 8/02* (2013.01); *C10G 3/40* (2013.01); *C10G 3/50* (2013.01); *C10G 45/00* (2013.01); *C10G 45/06* (2013.01); *C10G 45/08* (2013.01); *C10G 45/10* (2013.01); *C10G 65/12* (2013.01); *C10G 69/06* (2013.01); *B01J 2208/027* (2013.01); *B01J 2219/00103* (2013.01); *B01J 2219/24* (2013.01); *C10G 2300/1011* (2013.01); *C10G 2300/1014* (2013.01); *C10G 2300/1018* (2013.01); *C10G 2300/4081* (2013.01); *C10G 2400/02* (2013.01); *C10G 2400/04* (2013.01); *C10G 2400/08* (2013.01); *Y02P 30/20* (2015.11)

(58) Field of Classification Search
CPC ... B01J 19/24; B01J 8/04; B01J 8/0446; B01J 8/0449; B01J 8/0457; C10G 3/40; C10G 3/44–3/46; C10G 3/50; C10G 69/06; C10G 45/06; C10G 45/08; C10G 45/10
See application file for complete search history.

(56) References Cited

U.S. PATENT DOCUMENTS 4,504,503 A * 3/1985 Biernoth ................ A23D 7/001
426/312
7,999,142 B2 * 8/2011 Kalnes ................... C10G 45/58
585/240

(Continued)

FOREIGN PATENT DOCUMENTS

EP 1489157 A1 12/2004

OTHER PUBLICATIONS

Extended European Search Report issued Jul. 12, 2016 in corresponding European application No. 13863625.3 (10 pages).

(Continued)

*Primary Examiner* — Lessanework Seifu
(74) *Attorney, Agent, or Firm* — Osha Liang LLP (57) ABSTRACT

A process for converting triacylglycerides-containing oils into crude oil precursors and/or distillate hydrocarbon fuels is disclosed. The process may include reacting a triacylglycerides-containing oil-carbon dioxide mixture at a temperature in the range from about 250° C. to about 525° C. and a pressure greater than about 75 bar to convert at least a portion of the triacylglycerides to a hydrocarbon or mixture of hydrocarbons comprising one or more of isoolefins, isoparaffins, cycloolefins, cycloparaffins, and aromatics.

17 Claims, 3 Drawing Sheets

(51) Int. Cl.
    *C10G 45/06*     (2006.01)
    *C10G 45/08*     (2006.01)
    *C10G 45/10*     (2006.01)
    *B01J 8/02*     (2006.01)
    *C10G 65/12*     (2006.01)
    *C10G 45/00*     (2006.01)
    *C10G 69/06*     (2006.01)

(56) References Cited

U.S. PATENT DOCUMENTS

| | | | |
|---|---|---|---|
| 2007/0144060 A1 | 6/2007 | Ikura | |
| 2008/0071125 A1 | 3/2008 | Li | |
| 2009/0166261 A1* | 7/2009 | Li | C10G 31/08 208/177 |
| 2010/0256428 A1 | 10/2010 | Marker et al. | |
| 2011/0124931 A1 | 5/2011 | Yao et al. | |
| 2011/0196179 A1 | 8/2011 | Bradin | |
| 2012/0108861 A1 | 5/2012 | Roberts, IV et al. | |
| 2012/0142984 A1 | 6/2012 | Roberts et al. | |
| 2013/0174475 A1* | 7/2013 | Kim | C10L 1/04 44/307 |

OTHER PUBLICATIONS

International Prelminary Report on Patentability issued Jun. 16, 2015 in corresponding International Application No. PCT/US2013/073136 (9 pages).

* cited by examiner

CONVERSION OF TRIACYLGLYCERIDES-CONTAINING OILS

CROSS-REFERENCE TO RELATED APPLICATION

This application, pursuant to 35 U.S.C. §120, claims benefit to U.S. patent application Ser. No. 13/711,140 filed Dec. 11, 2012, now U.S. Pat. No. 9,024,096, which is incorporated by reference in its entirety.

FIELD OF THE DISCLOSURE

Embodiments disclosed herein relate generally to production of useful hydrocarbons, such as distillate fuels, from triacylglycerides-containing plant or animal fats-containing oils.

BACKGROUND

Thermal reforming of triacylglycerides-containing oils such as those derived from crops, animal fats or waste vegetable and animal-derived oils in the presence of carbon dioxide involves many types of chemical reactions. As one example, some prior an processes catalytically hydrotreat the triacylglyeerides-containing oils, converting the unsaturated aliphatic chains in the triacylglycerides-containing oils to straight chain paraffins while simultaneously deoxygenating/decarboxylating the acid and glyceryl groups to form water, carbon dioxide and propane. Two downstream processes are then required to (a) skeletally isomerize the n-paraffins to isoparaffins to produce specification grade diesel fuels, and (b) hydrocracking the diesel range n-paraffins and isoparaffins to hydrocarbons to produce specification grade jet fuels. These processes often result in aqueous phase materials rich in corrosive organic acids. As a second example, triacylglycerides-containing oils may be reacted in the presence of supercritical water to produce hydrocarbons, but such processes require operation at pressures above the critical pressure of water, such as greater than about 210 bar (217.7 atm), and requires a high energy demand for preheating and vaporizing water to supercritical temperatures, such as greater than about 374 C (705 F).

SUMMARY OF THE DISCLOSURE

In one aspect, embodiments disclosed herein relate to a process for converting triacylglycerides-containing oils into crude oil precursors and/or distillate hydrocarbon fuels. The process may include: reacting a triacylglycerides-containing oil-carbon dioxide mixture at a temperature in the range from about 250° C. to about 525° C. and a pressure greater than about 75 bar to convert at least a portion of the triacylglycerides to a hydrocarbon or mixture of hydrocarbons comprising one or more of isoolefins, isoparaffins, cycloolefins, cycloparaffins, and aromatics.

In another aspect, embodiments disclosed herein relate to a process for converting triacylglycerides-containing oils into crude oil precursors and/or distillate hydrocarbon fuels. The process may include: mixing a triacylglyceride containing oil with carbon dioxide to form a triacylglycerides-CO2 mixture; reacting the triacylglycerides-CO2 mixture in a thermal reforming reaction zone under reaction conditions sufficient to convert at least a portion of the triacylglycerides via thermal reforming to hydrocarbon compounds comprising one or more of isoolefins, isoparaffins, cycloolefins, cycloparaffins, and aromatics; and recovering an effluent from the thermal reforming reaction zone.

In another aspect, embodiments disclosed herein relate to a system for converting triacylglycerides-containing oils into crude oil precursors and/or distillate hydrocarbon fuels. The system may include: a mixing device for mixing a triacylglycerides-containing oil feed with carbon dioxide to form an oil-CO2 mixture; a thermal reforming reactor for reacting the oil-CO2 mixture at a temperature in the range of 250° C. to about 525° C. and a pressure greater than about 75 bar to produce a reaction effluent; and a separator for separating the reaction effluent into a first separation product comprising carbon dioxide and a second separation product comprising hydrocarbon compounds including one or more of isoolefins, isoparaffins, cycloolefins, cycloparaffins, and aromatics. In some embodiments, the oil-CO2 mixture may also include water, which may hydrolyze a portion of the triacylglycerides in the feed.

Other aspects and advantages will be apparent from the following description and the appended claims.

DETAILED DESCRIPTION

In one aspect, embodiments disclosed herein relate generally to production of useful hydrocarbons, such as paraffins, from triacylglycerides-containing oils, such as from renewable feedstocks. In another aspect, embodiments disclosed herein relate to processes and systems for converting triacylglycerides-containing oils into crude oil precursors and/or distillate hydrocarbon fuels.

Renewable feedstocks having triacylglycerides-containing oils useful in embodiments disclosed herein may include fatty acids, saturated triacylglycerides, and triacylglycerides having one or more olefinic bonds. For example, triacylglycerides-containing oils may include oils from at least one of camelina, carinata, jatropha, karanja, moringa, palm, castor, cotton, corn, linseed, peanut, soybean, sunflower, tung, babassu, and canola, or at least one triacylglycerides-containing oil from at least one of, shea butter, tall oil, tallow, waste vegetable oil, trap greases, used cooking oil, algal oil, and pongamia. In other embodiments, the triacylglycerides-containing oils may include free fatty acids derived from at least one of camelina, carinata, cotton, jatropha, karanja, moringa, palm, castor, corn, linseed, peanut, soybean, sunflower, tung, babassu, or at least one of canola, shea butter, tall oil, tallow, waste vegetable oil, trap greases, used cooking oil, algal oil, and pongamia. In another embodiment, renewable feedstocks may include free fatty acids produced by hydrolysis of one or more of the above described triacylglycerides-containing oils.

A mixture of the triacylglycerides-containing oil with carbon dioxide and hydrogen may be reacted at a temperature in the range from about 250° C. to about 525° C. and a pressure greater than about 75 bar to convert at least a portion of the triacylglycerides to a hydrocarbon or a mixture of hydrocarbons including one or more of isoolefins, isoparaffins, cycloolefins, cycloparaffins, and aromatics. In some embodiments, the reaction conditions may be such that the temperature and pressure are above the supercritical temperature and pressure of carbon dioxide. In other embodiments, the reaction conditions may be such that either or both of the temperature and pressure are in the near critical range, such as within about 10° C. of the critical temperature of carbon dioxide or within 7.5 bar of the critical pressure of carbon dioxide. The resulting reaction effluent may then be further treated and/or separated to recover the hydrocarbon products.

Embodiments disclosed herein thus utilize supercritical or near critical carbon dioxide. A supercritical fluid is any substance at a temperature and pressure above its critical point, where distinct liquid and gas phases do not exist. Supercritical fluids can effuse through solids like a gas and dissolve materials like a liquid. In addition, in the near critical range, small changes in pressure or temperature may result in large changes in density, allowing many properties of a supercritical fluid to be "fine-tuned". Another advantage is the improvement in mass transfer and associated heat transfer in the reacting triacylglycerides-containing oils dissolved in the supercritical phase. Supercritical carbon dioxide is suitable as a substitute for organic solvents in a range of industrial processes, and has been found to be useful in thermal reforming of triacylglycerides-containing oils as described in embodiments herein.

One advantage of using supercritical carbon dioxide in a thermal reforming process to convert triacylglycerides-containing oils is its ability to achieve supercritical fluid property enhancements at significantly lower pressures and temperatures than those for the case of other supercritical fluids. Another advantage of the use of carbon dioxide relative to water in a thermal reforming process is its lower latent heat of vaporization, 247 Btu/lb vs. 970 Btu/lb for water, which translates to lower energy requirements for raising the solvent to its supercritical condition. A still further advantage of using carbon dioxide is the avoidance of production of an aqueous phase containing high concentrations of corrosive acids. Also, using carbon dioxide avoids potential emulsion problems between the aqueous phase and the hydrocarbon phase that result with the use of water in a catalytic hydrothermolysis process to convert triacylglycerides-containing oils.

To form the triacylglycerides-carbon dioxide mixture, a triacylglycerides-containing oil may be mixed with carbon dioxide. An in-line mixer, a mixing tee, or other suitable equipment may be used to facilitate the dissolution of the triacylglycerides-containing oil in the carbon dioxide. In some embodiments, the triacylglycerides-carbon dioxide mixture may also include water and/or hydrogen, which may be added to the triacylglycerides-containing oil, the carbon dioxide, or the triacylglycerides-carbon dioxide mixture prior to the reacting as described above to form useful hydrocarbons.

The triacylglycerides-carbon dioxide-hydrogen mixture may have a CO2 to triacylglycerides mass ratio in the range from about 0.001:1 to about 1:1 in some embodiments; from about 0.01:1 to about 1:1 in other embodiments; and from about 0.1:1 to about 1:1 in yet other embodiments.

When present, the triacylglycerides-carbon dioxide mixture may have a hydrogen to triacylglycerides mass ratio in the range from about 0.001:1 to about 0.5:1 in some embodiments; from about 0.01:1 to about 0.5:1 in other embodiments; and from about 0.1:1 to about 0.5:1 in yet other embodiments.

When present, the triacylglycerides-carbon dioxide mixture may have a water to triacylglycerides mass ratio in the range from about 0.001:1 to about 1:1 in some embodiments; from about 0.01:1 to about 1:1 in other embodiments; and from about 0.1:1 to about 1:1 in yet other embodiments, such as from about 0.1:1 to about 0.5:1.

The resulting reaction effluent, which contains carbon dioxide and a hydrocarbon or a mixture of hydrocarbons including one or more of isoolefins, isoparaffins, cycloolefins, cycloparaffins, and aromatics, may then be further treated and/or separated to recover the hydrocarbon products.

Separation of the reaction effluent in some embodiments may include separating carbon dioxide from the reaction effluent. For example, the temperature and/or pressure of the effluent may be adjusted so as to result in phase separation of the carbon dioxide from the hydrocarbon products. A first separation product, including the carbon dioxide, and a second separation product, including the hydrocarbons, may be recovered. The separations may be performed below, at, or above the critical temperature and/or pressure of carbon dioxide, depending on the solubility of carbon dioxide in the reaction products.

Separation of the reaction effluent may also include separation of any water or hydrogen that may be added to the feed mixture or formed as a reaction product or byproduct.

In some embodiments, the recovered carbon dioxide, or a portion thereof, may then be compressed, as necessary, and recycled for admixture with the triacylglycerides-containing oil as described above.

Following carbon dioxide separations, the second separation product may be fractionated to separate the various hydrocarbon reaction products into products of select boiling ranges. In some embodiments, at least a portion of the second separation product may be hydrotreated to form additional distillate range hydrocarbons and/or to convert precursors in the reaction effluent to distillate range hydrocarbons. If necessary, hydrogen may be added to the second separation product prior to hydrotreatment. Following hydrotreatment, the hydrotreated product may then be fractionated to separate the various hydrocarbon reaction products into products of select boiling ranges. For example, following carbon dioxide separations or hydrotreatment, the hydrocarbon products may be fractionated to recover one or more hydrocarbon fractions, such as those boiling in the range of naphtha, diesel, or jet, among others.

In some embodiments, the above-mentioned triacylglycerides-containing oils, following thermal reforming, may be co-processed in the hydrotreatment zone with other renewable and/or non-renewable hydrocarbonaceous feedstocks, such as atmospheric gas oil (AGO), vacuum gas oil (VGO), or other feeds derived from petroleum, shale oil, tar sands, coal-derived oils, organic waste oils, and the like.

The reaction of the triacylglycerides to produce hydrocarbons may be primarily one or more thermal reforming reactions promoted by carbon dioxide and performed at a reaction temperature in the range from about 250° C. to about 525° C.; from about 350° C. to about 525° C. in some embodiments; and from about 425° C. to about 500° C. in other embodiments. Reaction conditions may also include a pressure greater than the critical pressure of carbon dioxide; between about 75 bar and about 175 bar in some embodiments; and between about 80 bar and about 120 bar in other embodiments, Conditions of temperature and/or pressure may be selected to be above the critical temperature and/or critical pressure of carbon dioxide or above the mixture critical temperature and/or critical pressure for the case of the optional co-feeding of water and the optional co-feeding of hydrogen. For the embodiments using optional water co-feed, the critical temperature and pressure will be the molar-averaged critical conditions of the mixtures of carbon dioxide and water. In some embodiments, the thermal reforming reactions are performed in the absence of externally supplied catalyst.

Figure 1:
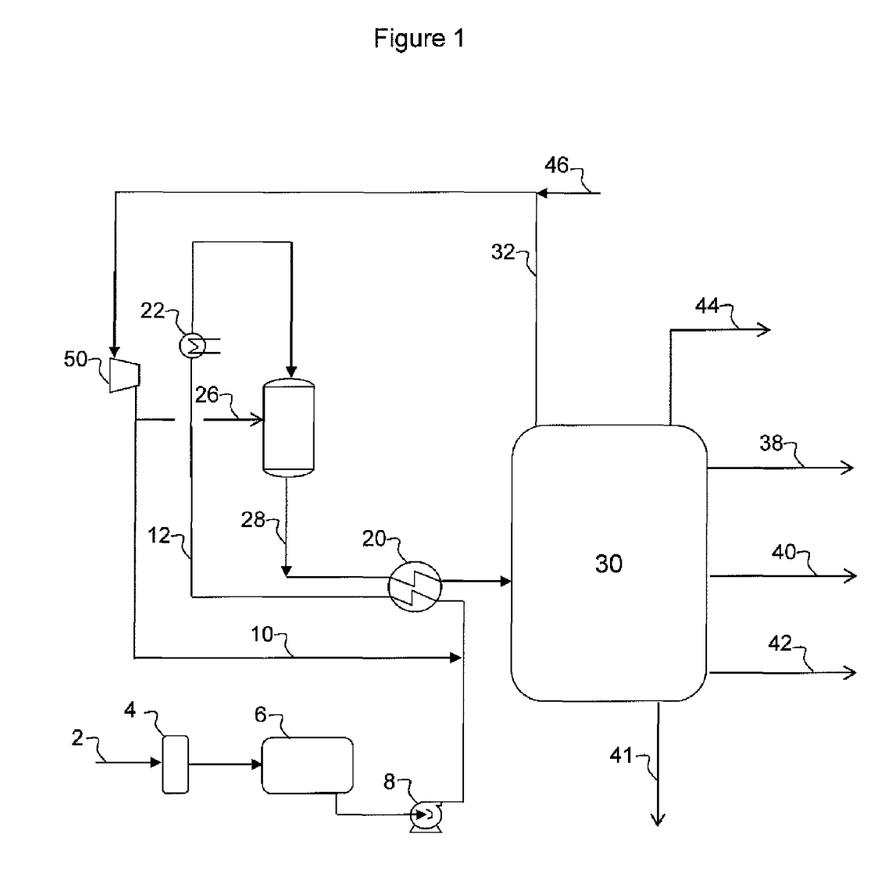
FIG. 1 is a simplified process flow diagram of a process according to embodiments herein.

Referring now to FIG. 1, a simplified process flow diagram of a process for converting triacylglycerides-containing oils into crude oil precursors and/or distillate hydrocarbon fuels according to embodiments herein is illustrated. A triacylglycerides-containing oil may be provided to the system via flow line 2, filtered if necessary in a filter 4, and stored in feed tank 6. The triacylglycerides-containing oil may then be fed via pump 8 and mixed with carbon dioxide fed via flow line 10. Mixing of the triacylglycerides-containing oil with carbon dioxide may be performed in a mixing device, such as a mixing tee, an agitated vessel, an in-line mixer or other mixing devices as known to those of skill in the art.

The triacylglycerides-CO2 mixture 12 may then be fed to thermal reforming reactor 18 and maintained at reaction conditions for a time sufficient to convert at least a portion of the triacylglycerides to distillate hydrocarbons or precursors thereof. Reaction conditions may include a temperature in the range from about 250° C. to about 525° C. and a pressure of at least 75 bar. The residence time required in reactor 18 to convert the triacylglycerides may vary depending upon the reaction conditions as well as the specific triacylglycerides-containing oil used. In some embodiments, residence times in reactor 18 may be in the range from about 3 to about 6 minutes. To elevate the temperature of the feed to reaction conditions, heat may be supplied to the feed via one or more of a feed-effluent exchanger 20, and/or one or more indirect heat exchangers 22 to heat the triacylglycerides-CO2 mixture 12, among other options. The thermal reforming can also include some exothermic reactions, which may supply additional heat to maintain the required reaction conditions and to reduce external heat input requirements. In some embodiments, one or more CO2 feed lines 26 may be provided to control the exotherm and the temperature or temperature profile in thermal reforming reactor 18, such as by the introduction of liquid CO2 into the reactor.

Following reaction of the triacylglyeerides in thermal reforming reactor 18, the reaction effluent 28 may be recovered, used to preheat the feed in feed-effluent exchanger 20, and further processed to recover the distillate hydrocarbons.

In some embodiments, effluent 28 may be cooled and fed to a thermal reforming effluent treatment system 30 to further treat and/or separate the effluent into various fractions. For example, thermal reforming effluent treatment system 30 may separate carbon dioxide 32 from the hydrocarbons. The resulting hydrocarbons may also be fractionated into two or more fractions, which, as illustrated, may include distillate hydrocarbons boiling in the range of naphtha 38, diesel 42, jet 40, or vacuum gas oil (VGO) 41. Some offgas 44 may also be produced.

The carbon dioxide fraction 32 may then be recycled and combined, as necessary, with makeup carbon dioxide 46 for mixture with the triacylglycerides-containing oil as described above. Compressor 50 may be used to pressurize the carbon dioxide feed stream, as necessary.

Figure 2:
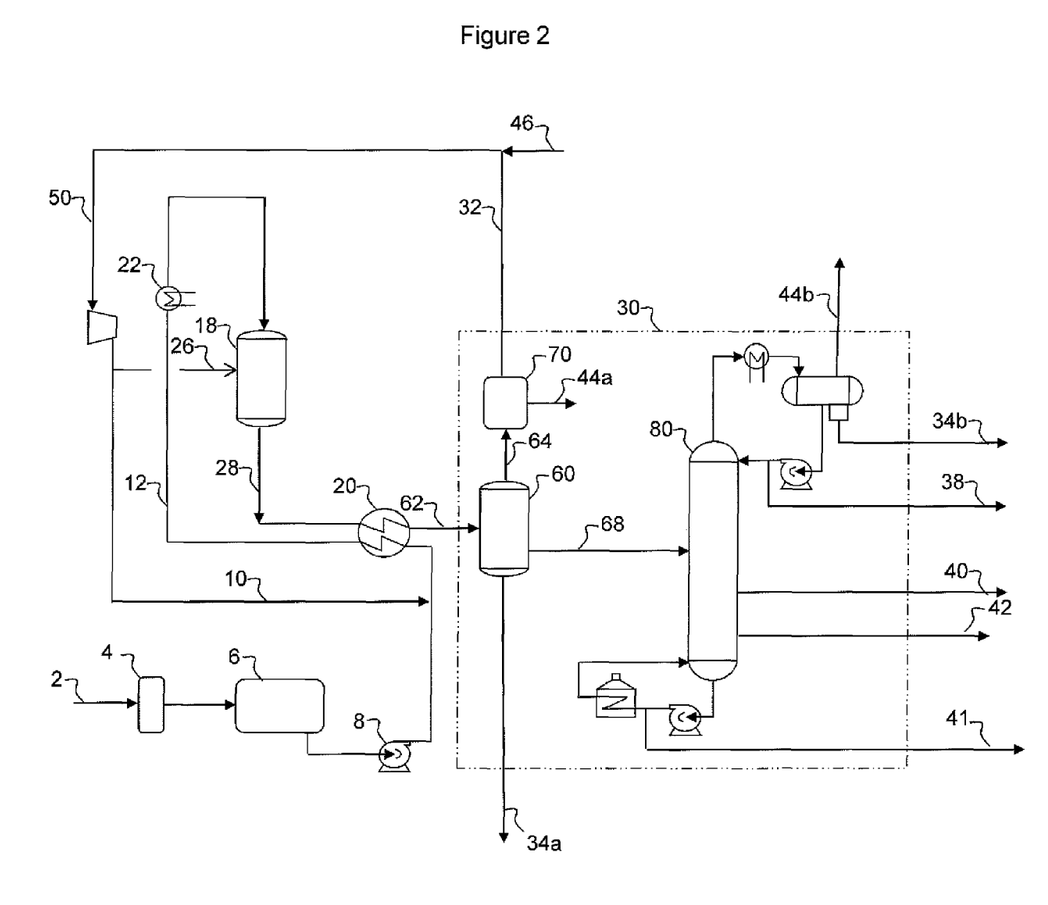
FIG. 2 is a simplified process flow diagram of a process according to embodiments herein.

Referring now to FIG. 2, a simplified process flow diagram of a process for converting triacylglycerides-containing oils into crude oil precursors and/or distillate hydrocarbon fuels according to embodiments herein is illustrated, where like numerals represent like parts. In this embodiment, effluent treatment system 30 includes a drum 60 for phase separation of the carbon dioxide in the cooled effluent 62 from the hydrocarbon components, where the phase separation may be a fluid/liquid, liquid/liquid or vapor/liquid separation. For example, the pressure of stream 62 may be reduced to produce a vapor phase containing carbon dioxide that may be separated from hydrocarbon liquids. The gaseous components, including carbon dioxide, hydrogen, and possibly some light reaction byproducts, may be recovered from drum 60 via flow line 64. Alternatively, phase separation may be performed with carbon dioxide as a liquid or a supercritical fluid.

Liquid components, or heavier liquid components, including the hydrocarbons, may settle in the bottom of drum 60, and may be recovered via flow line 68. Where sufficient water is added to or present in the thermal reforming feed mixture, or produced as a reaction product or byproduct, separations in drum 60 may result in formation of two liquid phases, where the water may be recovered via flow line 34a and the hydrocarbons may be recovered via flow line 68.

Following separations in drum 60, the gaseous products in flow line 64 may be separated, via a gas separation device 70 to result in a recycle carbon dioxide fraction 32, and an off-gas fraction 44a, as described above. The liquid hydrocarbon products may then be fed to a fractionator 80 for separation of the hydrocarbons into one or more boiling range fractions including naphtha 38, diesel 40, vacuum gas oil (VGO) 41, and jet 42. An additional off-gas fraction 44b and water fraction 34b may also result from separations in fractionator 80.

Figure 3:
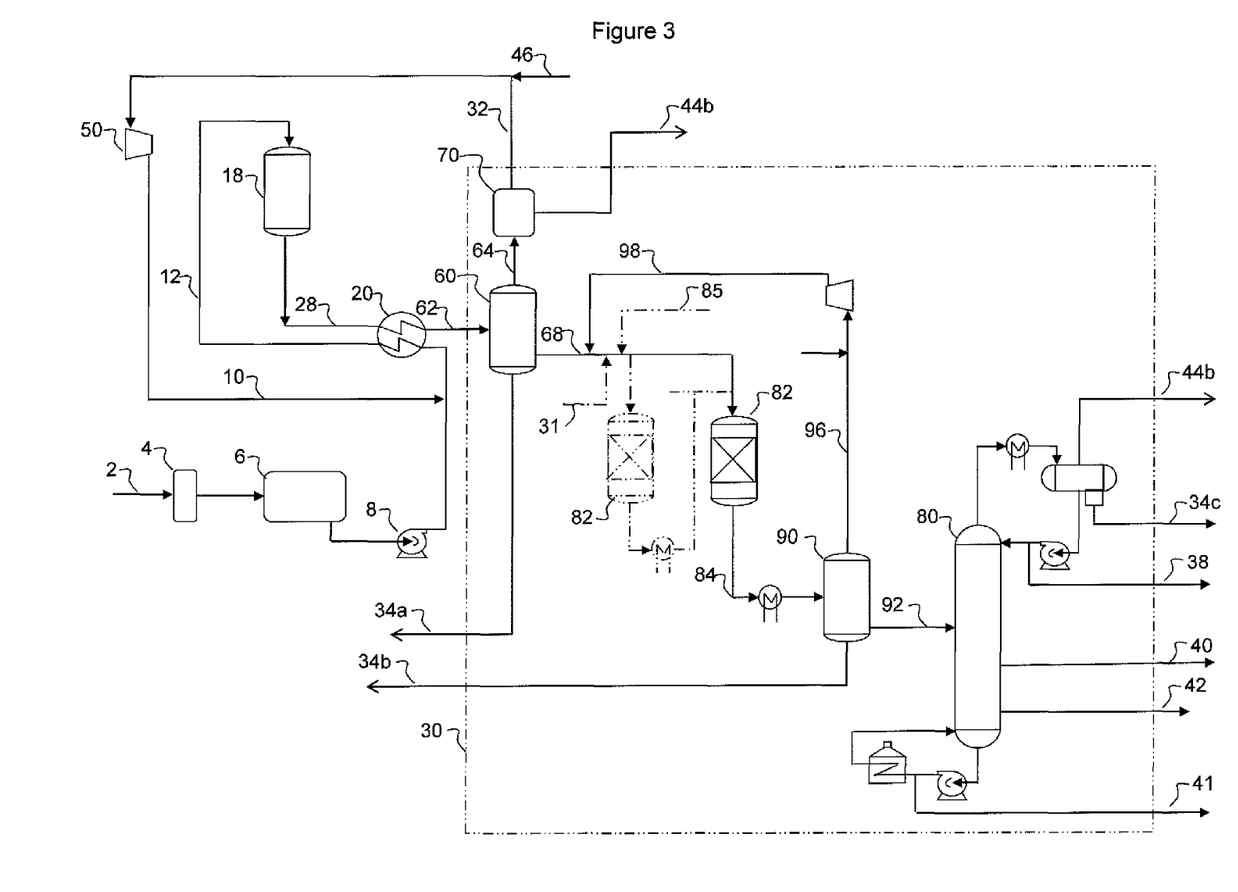
FIG. 3 is a simplified process flow diagram of a process according to embodiments herein.

Referring now to FIG. 3, a simplified process flow diagram of a process for converting triacylglycerides-containing oils into crude oil precursors and/or distillate hydrocarbon fuels according to embodiments herein is illustrated, where like numerals represent like parts. In this embodiment, the thermal reforming effluent 28 undergoes gas separations before hydrotreatment of the products formed in thermoforming reactor 18.

Thermal reforming effluent 28 may be fed to a drum 60 for separation of the carbon dioxide in the effluent from the hydrocarbon components. The gaseous components, including carbon dioxide and possibly some light reaction byproducts, may be recovered from drum 60 via flow line 64. Liquid components may settle in the bottom of drum 60, resulting in formation of a two-phase system, where any water may be recovered via flow line 34a and the hydrocarbons may be recovered via flow line 68. A water fraction 34b may also be produced in drum 60 in the flow scheme of FIG. 3.

Following separations in drum 60, the gaseous products in flow line 64 may be separated via a gas separation device 70 as described above with respect to FIG. 2 to result in a recycle carbon dioxide fraction 32 and an off-gas fraction 44a. The liquid hydrocarbon products may then be fed to a hydrotreater 82 via flow line 68. Following hydrotreatment, the hydrotreated effluent 84 may be separated using a flash drum 90 to recover a hydrogen gas fraction 96, which may be recycled upstream of the hydrotreater 82 via flow line 98, and a hydrotreated product fraction 92.

Following separations in drum 90, the liquid hydrocarbon products 92 may then be fed to a fractionator 80 for separation of the hydrocarbons into one or more boiling range fractions including naphtha 38, diesel 40, vacuum gas oil (VGO) 41, and jet 42. An additional off-gas fraction 44b and water fraction 34c may also result from separations in fractionator 80.

Additional hydrocarbon feedstocks may be co-processed with thermal reforming effluent 28, 62 and may be fed to effluent treatment system 30 via flow line 85. Non-renewable hydrocarbon feedstocks, for example, may include one or more of petroleum distillates; shale oil distillates; tar sands-derived distillates; coal gasification byproduct oils; and coal pyrolysis oils, among others. If necessary, some sulfur-containing compound such as, for example, dimethyl disulfide dissolved in a suitable hydrocarbon solvent, may be fed to effluent treatment system 30 via flow line 31 in order to maintain the catalysts in their most active states.

Catalysts useful in hydrotreater 82 may include catalyst that may be used for the hydrotreating or hydrocracking of a hydrocarbon feedstock. A hydrotreating catalyst, for example, may include any catalyst composition that may be used to catalyze the hydrogenation of hydrocarbon feedstocks to increase its hydrogen content and/or remove heteroatom contaminants. A hydrocracking catalyst, for example, may include any catalyst composition that may be used to catalyze the addition of hydrogen to large or complex hydrocarbon molecules as well as the cracking of the molecules to obtain smaller, lower molecular weight molecules.

In some embodiments, the hydrotreating catalyst may effectively hydrodeoxygenate and/or decarboxylate the oxygen bonds contained in the hydrotreater feed reduce or eliminate the organic acid concentration in effluent 28. In some embodiments, greater than 99%, 99.9%, or 99,99% of the organic acids may be converted over the hydrotreatment catalyst.

Hydrotreating catalysts that may be useful include catalysts selected from those elements known to provide catalytic hydrogenation activity. At least one metal component selected from Group 8-10 elements and/or from Group 6 elements is generally chosen. Group 6 elements may include chromium, molybdenum and tungsten, Group 8-10 elements may include iron, cobalt, nickel, ruthenium, rhodium, palladium, osmium, iridium and platinum. The amount(s) of hydrogenation component(s) in the catalyst suitably range from about 0.5% to about 10% by weight of Group 8-10 metal component(s) and from about 5% to about 25% by weight of Group 6 metal component(s), calculated as metal oxide(s) per 100 parts by weight of total catalyst, where the percentages by weight are based on the weight of the catalyst before sulfiding. The hydrogenation components in the catalyst may be in the oxidic and/or the sulphidic form. If a combination of at least a Group 6 and a Group 8 metal component is present as (mixed) oxides, it will be subjected to a sulfiding treatment prior to proper use in hydrocracking. In some embodiments, the catalyst comprises one or more components of nickel and/or cobalt and one or more components of molybdenum and/or tungsten or one or more components of platinum and/or palladium. Catalysts containing nickel and molybdenum, nickel and tungsten, platinum and/or palladium are useful.

In some embodiments, hydrotreater 82 may include two or more beds or layers of catalyst, such as a first layer including a hydrocracking catalyst and a second layer including a hydrotreating catalyst.

In some embodiments, the layered catalyst system may include a lower catalyst layer that includes a bed of a hydrocracking catalyst suitable for hydrocracking any vacuum gas oil (VGO) range thermal reforming products or added feeds to diesel range or lighter hydrocarbons. The hydrocracking catalysts used may also be selected to minimize or reduce dearomatization of the alkylaromatic formed in the thermal reforming reactor. VGO cracking catalysts that may be used according to embodiments herein include one or more noble metals supported on low acidity zeolites wherein the zeolite acidity is widely distributed throughout each catalyst particle. For example, one or more catalysts as described in U.S. Pat. Nos. 4,990,243, 5,069,890, 5,071,805, 5,073,530, 5,141,909, 5,277,793, 5,366,615, 5,439,860, 5,593,570, 6,860,986, 6,902,664, and 6,872,685 may be used in embodiments herein, each of which are incorporated herein by reference with respect to the hydrocracking catalysts described therein. In some embodiments, the inclusion of the VGO hydrocracking may result in extinctive hydrocracking of the heavy hydrocarbons, such that the only net hydrocarbon products include diesel range and lighter hydrocarbons.

One skilled in the art will recognize that the various catalyst layers may not be made up of only a single catalyst, but may be composed of an intermixture of different catalysts to achieve the optimal level of metals and deoxygenation for that layer. Although some olefinic bond hydrogenation will occur in the lower portion of the zone, the removal of oxygen, nitrogen, and sulfur may take place primarily in the upper layer or layers. Obviously additional metals removal also will take place. The specific catalyst or catalyst mixture selected for each layer, the number of layers in the zone, the proportional volume in the bed of each layer, and the specific hydrotreating conditions selected will depend on the feedstock being processed by the unit, the desired product to be recovered, as well as commercial considerations such as cost of the catalyst. All of these parameters are within the skill of a person engaged in the petroleum processing industry and should not need further elaboration here.

To produce additional distillate range fuels, such as where C20+ hydrocarbons are produced in thermal reforming reactor 18, some of the VGO fraction 41 may be recycled back to the thermal reforming reactor 18 or to hydrotreater 82 for additional processing. In some embodiments, the inclusion of the VGO hydrocracking catalysts in the hydrotreater reaction zone may result in extinctive hydrocracking of the heavy hydrocarbons, such that the only net hydrocarbon products include jet or diesel range and lighter hydrocarbons.

While the above-described systems are described with respect to a single thermal reforming reactor 18 and a single hydrotreater 82, the reaction zones may include two or more reactors arranged in series or in parallel. Likewise, back-up compressors, filters, pumps, and the like may also be used. Further, compressors may be single stage or multi-stage compressors, which in some embodiments may be used to compress a single gas stream in sequential stages or may be used to compress separate gas streams, depending on plant layout.

As described above, processes disclosed herein may be performed in a system or apparatus for converting triacylglycerides-containing oils into crude oil precursors and/or distillate hydrocarbon fuels. The system may include one or more mixing devices for mixing a triacylglycerides-containing oil feed with carbon dioxide and optionally water and/or hydrogen. For example, the system may include a first mixing device for mixing a triacylglycerides-containing oil feed with carbon dioxide to form an oil-CO2 mixture, and a second mixing device for mixing the oil-CO2 mixture with water to form a feed mixture.

The resulting mixture may then be fed via a flow conduit to a thermal reforming reactor for reacting the feed mixture at a temperature in the range of 250° C. to about 525° C. and a pressure greater than about 75 bar to produce a reaction effluent. The thermal reforming reactor may include, for example, one or more tubular conduits within a furnace configured to maintain a temperature of the thermal reforming reactor effluent proximate an outlet of the thermal reforming reactor at reaction conditions, such as a temperature in the range from about 400° C. to about 525° C., or at a temperature and pressure greater than the critical temperature and pressure of carbon dioxide. The furnace may be, for example, an electrically heated furnace, or a furnace fired with a fuel gas, such as a natural gas, synthesis gas, or light hydrocarbon gases, including those produced in and recovered from the thermal reforming reactor. Reaction conditions may be achieved by use of one or more pumps, compressors, and heat exchangers. A separator may then be used for separating carbon dioxide from hydrocarbons in the reaction effluent.

The system may also include a compressor for compressing carbon dioxide recovered from the separator, as well as one or more fluid conduits for recycling the compressed carbon dioxide to the mixing device for mixing carbon dioxide. In some embodiments, the system may include a hydrotreater to hydrotreat at least a portion of the reaction effluent.

The system may also include a fractionator for fractionating hydrocarbons in the reaction effluent or the hydrotreater effluent to form one or more hydrocarbon fractions boiling in the naphtha, jet or diesel range. To control reaction temperatures and exotherms in the thermal reforming reactor, the system may include one or more fluid conduits for injecting liquid CO2 into the thermal reforming reactor.

As described above, embodiments disclosed herein provide processes for the conversion of renewable feedstocks to infrastructure-compatible distillate fuels. For example, in some embodiments, the jet fraction recovered may have a total acid number of less than 0.015 expressed as mg KOH per gram; less than 0.010 in other embodiments. The jet may have an olefins content of less than about 5 vol % and an aromatics content of less than about 25 vol % in some embodiments. These properties, among others, may allow the jet and/or the diesel fractions produced in embodiments herein to be used directly as a fuel without blending. In some embodiments, the whole hydrocarbon liquid product recovered from the hydrotreatment reaction zone may be used to produce distillate fuels meeting military, ASTM, EN, ISO, or equivalent fuel specifications.

The process may be carried out in an economically feasible method at a commercial scale. Further, as compared to water-based methods for converting triacylglycerides, processes disclosed herein may be thermally efficient while using moderate reaction pressures, without being hampered by operability problems associated with catalyst fouling. For example, CO2 has a much lower critical temperature (31° C.) and critical pressure (72 bar) as compared to water (374° C. and 217 bar, respectively). Thus, there are many benefits to the present processes, which are performed in a carbon dioxide based system, including less severe conditions. Additionally, use of carbon dioxide may avoid the circulation of aqueous phase materials rich in corrosive organic acids that may result from use of supercritical water. Miscibility of carbon dioxide may further promote reaction efficiency as eliminating the multi-phase transport limitations of water-based triacylglyceride conversion systems. The carbon dioxide based reaction systems disclosed herein may additionally provide for the direct production of cycloparaffin and cycloolefin materials as well as aromatics, thus avoiding the need for skeletal isomerization of straight chain paraffins as may result in the water-based systems.

Hydrogen is consumed during the hydrotreating step, and the average specific gravity of the product may be reduced, such as from approximately 0.91 to about 0.8. Decarboxylation reactions form COx and that carbon loss may result in a reduced mass yield of liquid products, and an equivalent lower volumetric yield. The actual crude yield may be in the range from about 75% to about 90%, such as in the range from about 80% to 84%, depending on how the thermal reforming process is executed.

Naphtha, jet, and diesel fuels may be produced by processes disclosed herein. A higher boiling gas oil material may also be produced, and may contain high-quality, high hydrogen content paraffins in the C17 to C24 boiling range. These heavier hydrocarbons may be recycled to the thermal reforming reactor for further treatment and production of naphtha, jet, and diesel range products. Fuel gases (off gases) may also be produced, which may be used in some embodiments for process heat, hydrogen production, or recovered as individual products (LPG, ethylene, propylene, n-butane, iso-butane, etc.).

Fuels produced by embodiments herein may: contain cycloparaffins and aromatics; exhibit high density; exhibit high energy density; exhibit good low-temperature properties (freezing point, cloud point, pour point, and viscosity); exhibit natural lubricity; exhibit a wide range of hydrocarbon types and molecular weights similar to petroleum; and/or have good thermal stability. These fuels may thus be true "drop in" analogs of their petroleum counterparts and do not require blending to meet current petroleum specifications.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A system for converting triacylglycerides-containing oils into crude oil precursors and/or distillate hydrocarbon fuels, the system comprising:
    a mixing device for mixing a triacylglycerides-containing oil feed with carbon dioxide to form an oil-CO2 mixture;
    a thermal reforming reactor for reacting the oil-CO2 mixture at a temperature in the range of 250° C. to about 525° C. and a pressure greater than about 75 bar to produce a reaction effluent;
    a separator for separating the reaction effluent into a first separation product comprising carbon dioxide and a second separation product comprising hydrocarbon compounds including one or more of isoolefins, isoparaffins, cycloolefins, cycloparaffins, and aromatics; and
    a hydrotreater to hydrotreat at least a portion on of the second separation product.

2. The system of claim 1, further comprising one or more fluid conduits for recycling the first separation product to at least one of the mixing device to form the oil-CO2 mixture and the thermal reforming reactor to control temperature within the thermal reforming reactor.

3. The system of claim 1, further comprising a fractionator for fractionating hydrocarbons in the second separation product to form one or more hydrocarbon fractions boiling in the naphtha, jet or diesel range.

4. The system of claim 1, further comprising a fractionator for fractionating hydrocarbons in the hydrotreated product to form one or more hydrocarbon fractions boiling in the naphtha, jet or diesel range.

5. The system of claim 1, wherein the hydrotreater comprises at least two catalyst beds, and wherein:

a first catalyst bed comprises a catalyst having hydrogenation activity;
a second catalyst bed comprises a catalyst having hydrocracking activity.

6. The system of claim 5, wherein the catalyst bed proximate an inlet of the hydrotreater comprises a catalyst useful for at least one of:
decarboxylation;
hydrodeoxygenation of unsaturated free fatty acids to produce C5-C24 paraffins;
saturation of mono-, di- and tri-olefins contained in the alkyl backbone of the free fatty acids;
hydrodenitrogenation of trace organic nitrogen compounds; and
catalyst tolerance for water coming in with the hydrocarbonaceous feed.

7. The system of claim 1, further comprising at least one of:
one or more fluid conduits for co-processing a non-renewable hydrocarbon feedstock with the reaction effluent in the hydrotreater; and
one or more fluid conduits for introducing at least one of water and hydrogen to the triacylglycerides-containing oil feed, the carbon dioxide, or the oil-CO2 mixture upstream of the thermal reforming reactor.

8. A thermal reforming system for converting triacylglycerides-containing oils into hydrocarbons, the thermal reforming system comprising:
a flow conduit for providing a triacylglycerides-containing oil-carbon dioxide mixture;
a thermal reforming reactor configured for reforming, in the absence of an added catalyst, the triacylglycerides-containing oil-carbon dioxide mixture at a temperature in the range from about 250° C. to about 525° C. and a pressure greater than about 75 bar to convert at least a portion of the triacylglycerides to a mixture of hydrocarbons;
a flow conduit for recovering an effluent from the thermal reforming reactor;
a separator for separating the effluent recovered from the thermal reforming reactor into a first separation product comprising carbon dioxide and light reaction byproducts and a second separation product comprising the hydrocarons: and
a gas separation device for separating the carbon dioxide from the light reaction byproducts in the first separation product.

9. The thermal reforming system of claim 8, further comprising a heat exchanger for heating the triacylglycerides-containing oil-carbon dioxide mixture via indirect heat exchange with the effluent recovered from the thermal reforming reactor.

10. The thermal reforming system of claim 8, further comprising a flow conduit for introducing additional carbon dioxide to the thermal reforming reactor.

11. The thermal reforming system of claim 8, further comprising one or more feed lines for mixing water or hydrogen with the triacylglyeerides-containing oil-carbon dioxide mixture upstream of the thermal reforming reactor.

12. The thermal reforming system of claim 8, wherein the separator is a drum.

13. The thermal reforming system of claim 8, further comprising:
a hydrotreater for hydrotreating at least a portion of the second separation product; and
a fractionator for fractionating hydrocarbons in the second separation product to form one or more hydrocarbon fractions boiling in the naphtha, jet or diesel range.

14. A thermal reforming system for converting triacylglycerides-containing oils into hydrocarbons, the thermal reforming system comprising:
a mixer for mixing a triacylglycerides-containing oil with carbon dioxide;
a thermal reforming reactor configured for reforming, in the absence of an added catalyst, the triacylglycerides-containing oil-carbon dioxide mixture to convert at least a portion of the triacylgiycerides to a mixture of hydrocarbons;
a flow conduit for recovering an effluent from the thermal reforming reactor;
a feed-effluent exchanger for indirectly heating the triacylglycerides-containing oil-carbon dioxide mixture with the effluent recovered from the thermal reforming reactor;
a drum for separating the effluent into a first separation product comprising carbon dioxide and light reaction byproducts and a second separation product comprising the mixture of hydrocarbons;
a gas separation device for separating the carbon dioxide from the light reaction byproducts in the first separation product;
a recycle system for compressing and recycling the carbon dioxide recovered from the gas separation device;
one or more flow conduits for mixing hydrogen, a non-renewable hydrocarbon feedstock, or a mixture thereof with the second separation product;
a hydrotreater for hydrotreating at least a portion of the second separation product;
a second drum for separating an effluent from the hydrotreater to recover a hydrogen recycle stream and a hydrocarbon stream; and
a fractionation system for fractionating hydrocarbons in the hydrocarbon stream to produce two or more hydrocarbon fractions.

15. The thermal reforming system of claim 14, further comprising a flow conduit for injecting liquid carbon dioxide into the thermal reforming reactor to maintain a temperature or a temperature profile within the thermal reforming reactor.

16. The thermal reforming system of claim 14, wherein the hydrotreater comprises at least two catalyst beds, and wherein:
a first catalyst bed comprises a catalyst having hydrogenation activity;
a second catalyst bed comprises a catalyst having hydrocracking activity.

17. The thermal reforming system of claim 16, wherein the catalyst bed proximate an inlet of the hydrotreater comprises a catalyst useful for at least one of:
decarboxylation;
hydrodeoxygenation of unsaturated free fatty acids to produce C5-C24 paraffins;
saturation of mono-, di- and tri-olefins contained in the alkyl backbone of the free fatty acids;
hydrodenitrogenation of trace organic nitrogen compounds; and
catalyst tolerance for water coming in with the hydrocarbonaceous feed.

* * * * *